S. R. OWEN & F. M. MAHAN.
Felly Joint and Tightener.
No. 206,125. Patented July 16, 1878.
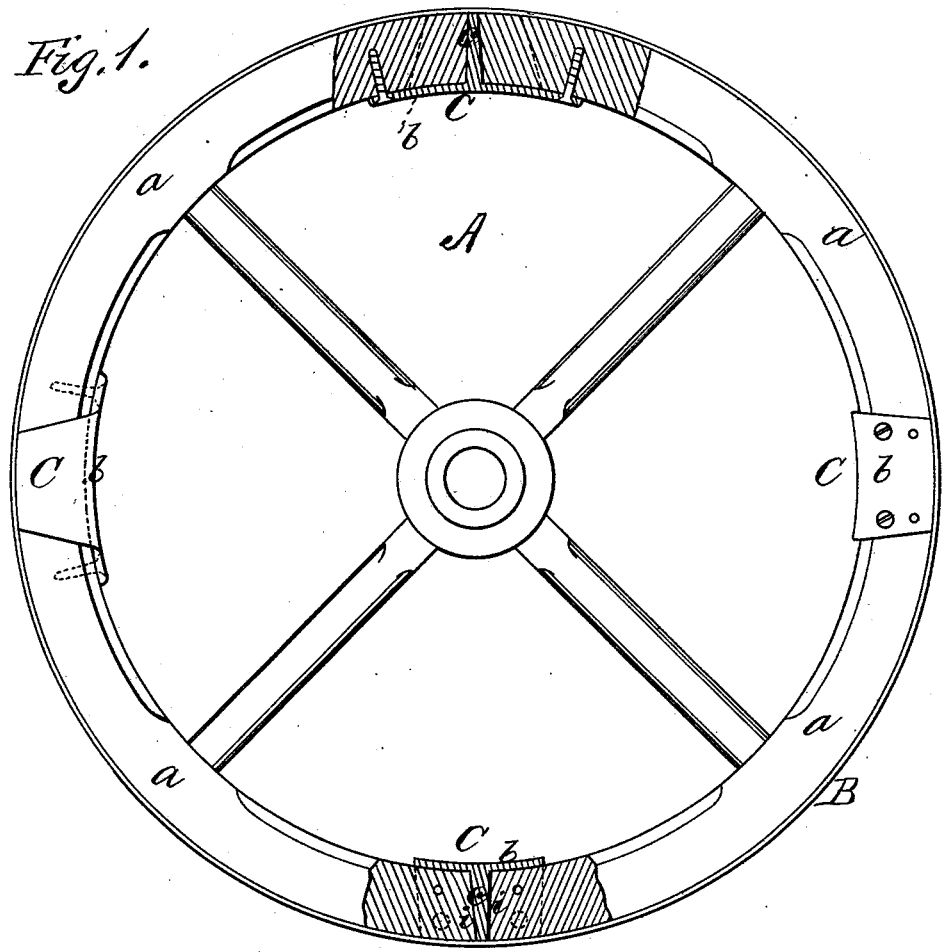
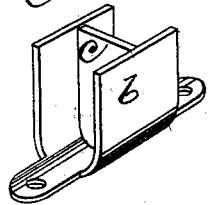
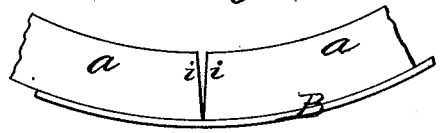
WITNESSES
Villette Anderson
F. J. Masi
INVENTORS
Silas R. Owen
Frank M. Mahan
by E. W. Anderson
ATTORNEY

UNITED STATES PATENT OFFICE.

SILAS R. OWEN AND FRANK M. MAHAN, OF ST. JOSEPH, MISSOURI.

IMPROVEMENT IN FELLY JOINT AND TIGHTENER.

Specification forming part of Letters Patent No. 206,125, dated July 16, 1878; application filed February 2, 1878.

*To all whom it may concern:*

Be it known that we, SILAS R. OWEN and FRANK M. MAHAN, of St. Joseph, in the county of Buchanan and State of Missouri, have invented a new and valuable Improvement in Felly Joint and Tightener; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of a wheel, partly in section, showing my invention applied. Fig. 2 is a perspective view of the combined felly joint and tightener; and Fig. 3 is a detail view showing the felly-sections prepared to receive the joint and tightener.

This invention has relation to improvements in combined felly joint and tightener; and the nature of the invention consists in a U-shaped plate adapted to embrace the ends of the adjacent felly-sections, having a transverse wedge-brace, designed to be forced between the said sections, whereby they are rigidly held against lateral displacement without the use of a dowel, and the felly is spread forcibly against the tire, as will be hereinafter more fully described.

In the annexed drawings, the letter A designates an ordinary vehicle-wheel, the felly of which is composed of a number of sections, *a*. B represents a tire applied to the wheel without heating. C represents our improved felly joint and tightener. It is composed of a U-shaped metallic, *b*, having a transverse wedge-brace, *c*, at the center of its length.

The felly is prepared to receive the device by opening the joints of adjoining sections with a saw and slightly beveling the end thereof, as shown at *i*, Fig. 3, to match the angular form of the wedge *c*. The point of the latter is inserted in the space between the sections and driven home, when the ends of the said sections are received in the spaces at each side of the said wedge, and incased on three sides by the plate *b*, thus preventing them from all tendency to lateral displacement. The plate *b* is then permanently riveted in place by means of suitable through-bolts, or by means of screws or other equivalent devices. One of these devices is applied to each joint, and when the wedge is driven home the felly is expanded forcibly against the tire, thereby holding it securely in place.

The joint and tightener will be made of various sizes to suit different kinds of fellies, and the wedge may be made separate from the U-plate, if we so elect.

The advantages of this device are mainly and briefly these: First, that while it is very effective it does not dish the wheel; second, that the strength of the tire is not impaired by burning, as is often the case when it is shrunk on; third, it may be applied to any description of sectional felly by a wagoner or farmer without calling in skilled labor; and, fourth, the tire not being shrunk on, the perimeter of the felly is not charred, whereby a firm bearing for the tire is obtained. When the tire is shrunk on by the heating process the charred surface of the felly is pulverized by the tire, and escapes in the form of dust from between the tire and felly in a short time, thus loosening the tire again.

We are aware that a U-shaped felly-plate has been made with a tranverse partition-plate designed to fit between the ends of the fellies; but such invention has no effect as a tightener, and we do not claim it.

We are also aware that three wedges have been used in connection with a bent felly-plate which incloses the same, but is not formed therewith, and this we do not claim.

What we claim as new, and desire to secure by Letters Patent, is—

In combination with the felly-sections *a* and a tire, the plate *b*, having a transverse wedge, *c*, formed entire with said plate, adapted to be driven between the felly-sections and receive their ends in the plate *b*, said plate being permanently secured to the felly, substantially as specified.

In testimony that we claim the above, we have hereunto subscribed our names in the presence of two witnesses.

SILAS R. OWEN.
FRANK M. MAHAN.

Witnesses:
JOHN E. WADE,
C. HARTZELL.